Sept. 17, 1963
C. A. S. AKRELL
3,104,280
SUBSCRIPTION-TELEVISION SYSTEM
Filed Dec. 20, 1960
4 Sheets-Sheet 2
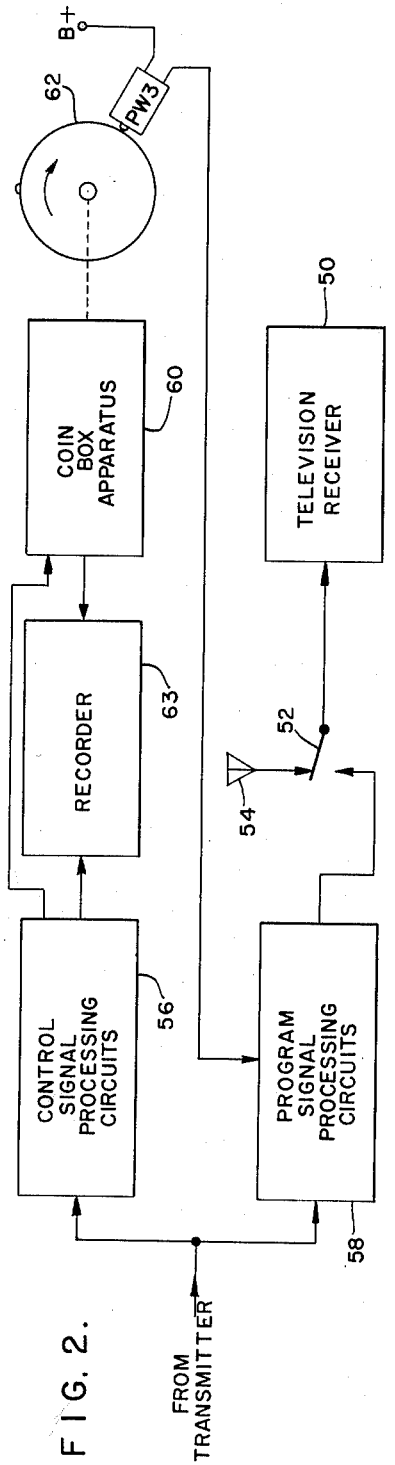
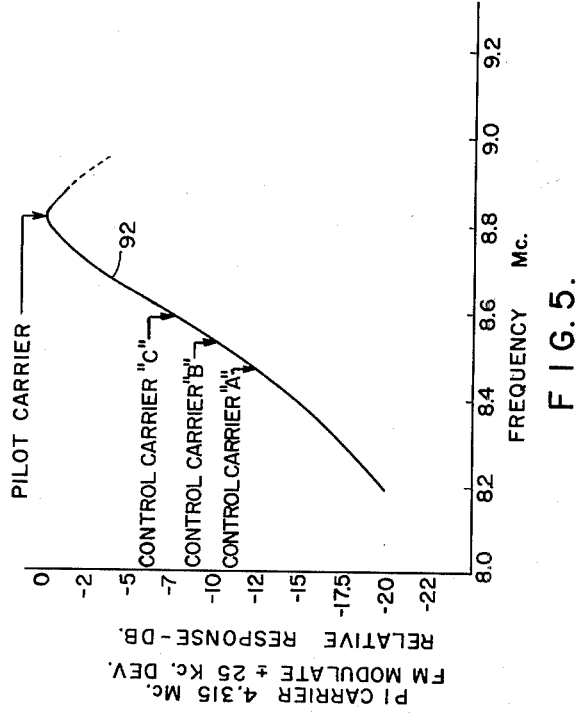
FIG. 5.
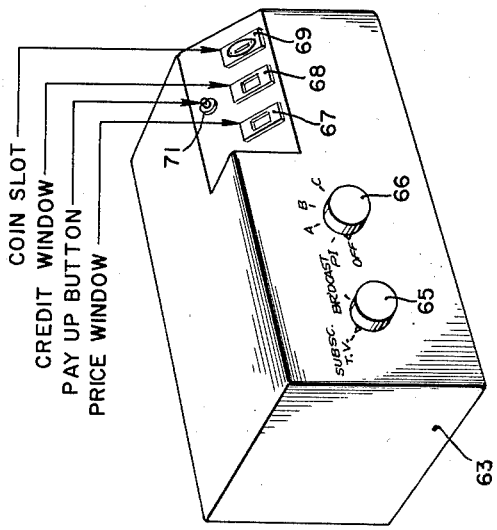
FIG. 3.
FIG. 2.
INVENTOR.
CARL A.S. AKRELL
BY
ATTORNEYS.

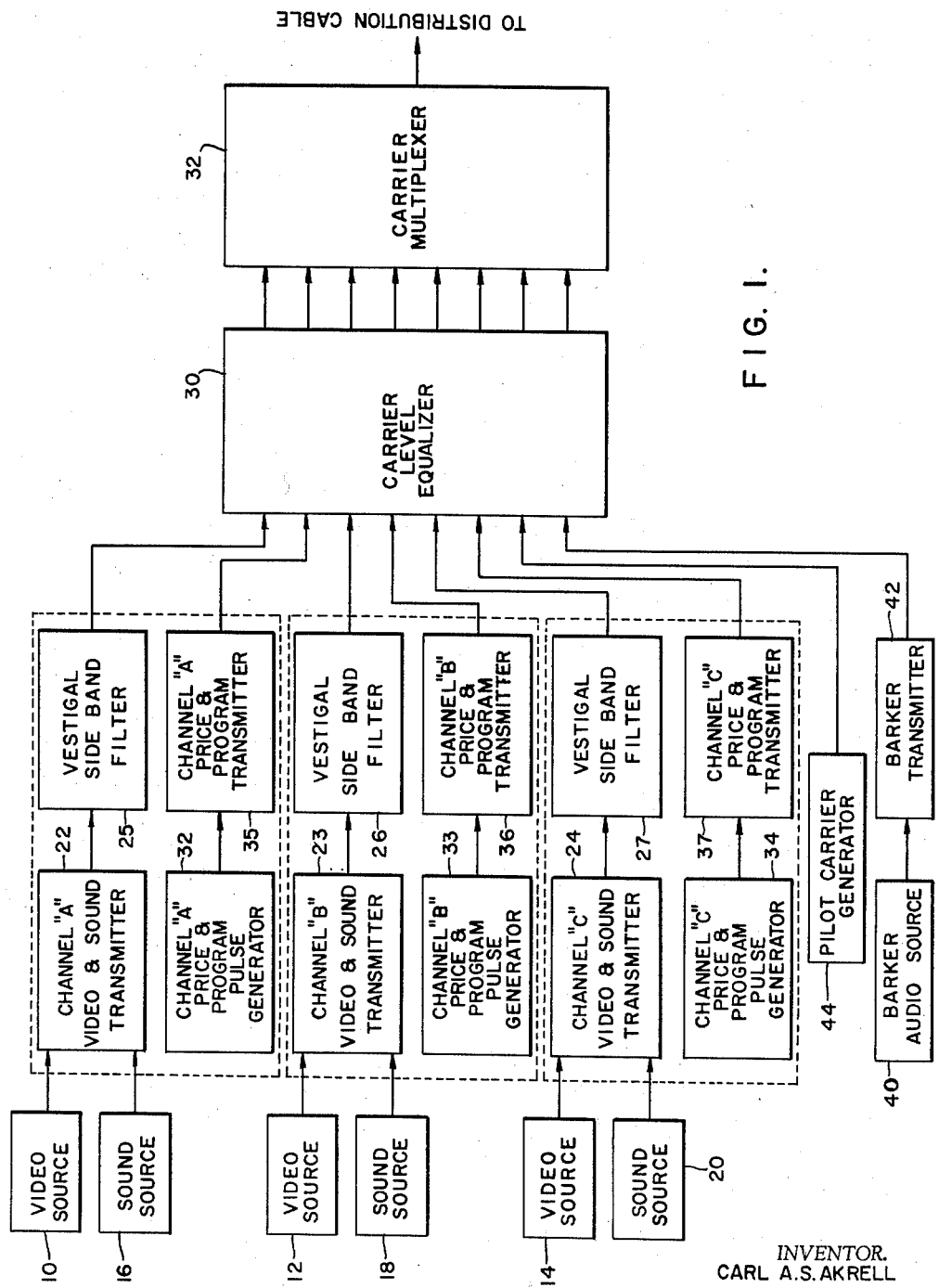

INVENTOR.
CARL A.S. AKRELL
BY Lyon & Lyon
ATTORNEYS.

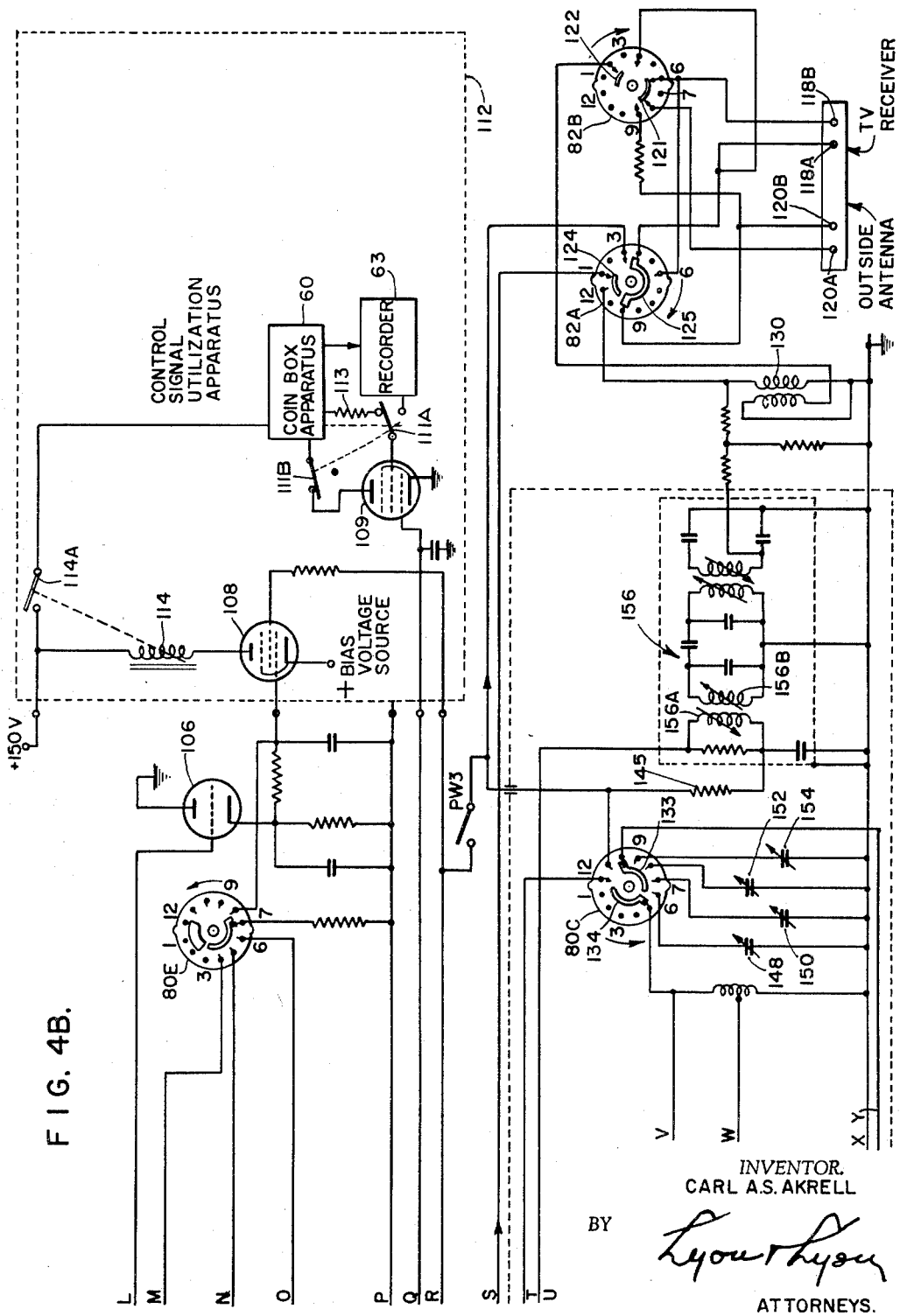

United States Patent Office 3,104,280
Patented Sept. 17, 1963

3,104,280
SUBSCRIPTION-TELEVISION SYSTEM
Carl A. S. Akrell, Los Angeles, Calif., assignor to Paramount Pictures Corporation, New York, N.Y., a corporation of New York
Filed Dec. 20, 1960, Ser. No. 77,184
12 Claims. (Cl. 178—5.1)

This invention relates to subscription-television systems and, more particularly, to improvements therein.

A subscription-television system may be described as a system for transmitting television programs in such a manner that the television-program information is unintelligible to all receivers except those equipped with apparatus capable of making the program intelligible. These receivers, upon either assumption of the liability for a price demanded for payment for the program by the subscriber or upon the actual payment by him for the program, are enabled to intelligibly reproduce the television-program information.

Since subscription television is sought to be introduced into those areas in which people already own their television receivers, the integration of those receivers into a subscription-television system provides a problem. At the outset, it was thought that these receivers should have their circuits modified in a manner to accomplish the functions briefly indicated above. However, due to the expense involved, technical problems arising in modifying different types of receivers, and problems which arise with the owners of the receivers, this approach for integrating the receivers into the subscription-television is not deemed the best available.

A better approach would be to make some form of an attachment which would connect between an antenna and the antenna terminals of a receiver, or, where a closed-circuit television system is being established, between the wire distributing the program signals and the antenna terminals of the receiver. These attachments can be very economically fabricated at a central manufacturing location and then very simply installed by individuals with a minimum of technical skill. Since in a subscription-television system it is desired to prevent a subscriber's receiver from intelligibly reproducing program signals until the subscriber has either paid the price requested for viewing the program or indicated that he will assume payment therefor, a receiver attachment should be capable of translating signals rendered unintelligible at a transmitter to signals which can be intelligibly reproduced by the subscriber's receiver after payment has been made. Such receiver attachment should also be able to process whatever control signals are transmitted in association with the program signals and should preferably provide a facility for enabling the reproduction of audio signals sent from the transmitter other than the program audio, which can inform the subscriber as to the merits of the type of program for which payment is sought. These audio signals are known as the barker audio signals.

An object of this invention is to provide an improved attachment of the general type described.

Another object of this invention is to provide a more inexpensive subscription-television receiver attachment of the type described.

Still another object of the present invention is the provision of a simpler subscription-television receiver attachment of the type described.

These and other objects of the invention are achieved by providing a subscription-television system wherein there are transmitted program video and audio signals in a manner such that a commercial receiver without an attachment, in accordance with this invention, or a receiver having such attachment wherein the price demanded for viewing the program has not been paid, is unable to intelligibly reproduce the signals transmitted. There are further transmitted audio signals, known as barker audio, which are frequency-modulated on their own carrier. Signals generally designated as control signals are also transmitted modulated on a carrier. The control signals more specifically include signals representing the cost of a program and signals for identifying the program. In addition, there is transmitted a carrier signal, known as the pilot carrier. If more than one channel of subscription television is sought to be transmitted, then it is necessary to transmit program video and audio and associated control signals for each channel. However, one pilot carrier and barker audio signals can serve for all the channels. The barker audio signals are transmitted in a channel hereafter designated as the "public-information" channel.

At the receiver, an attachment is provided which can be tuned to the "public-information" channel to receive the barker audio signals modulated on its carrier. These signals, together with a pilot carrier, are mixed and then introduced into the television receiver, which can process and reproduce the barker audio in the same manner as normal audio signals are reproduced by a receiver. The subscriber can then select whichever program appeals to him, in view of the information received. The control signals for all the channels are mixed with the pilot carrier. However, by selecting a channel, a filter is simultaneously selected which selects the control signals for that particular channel. A price is established at the attachment in response to these control signals. On payment of such price the control signals are recorded, and a mechanism is actuated for converting the unintelligible program and audio signals received over the selected channel to a form which the commercial receiver can readily handle.

The novel features that are considered characteristic of this invention are set forth with particularity in the appended claims. The invention itself, both as to its organization and method of operation, as well as additional objects and advantages thereof, will best be understood from the following description when read in connection with the accompanying drawings, in which:

FIGURE 1 is a block diagram of a transmitter in accordance with this invention;

FIGURE 2 is a block diagram of the apparatus at a subscriber's home;

FIGURE 3 is an isometric view of the container for a receiver attachment in accordance with this invention;

Figure 4A:
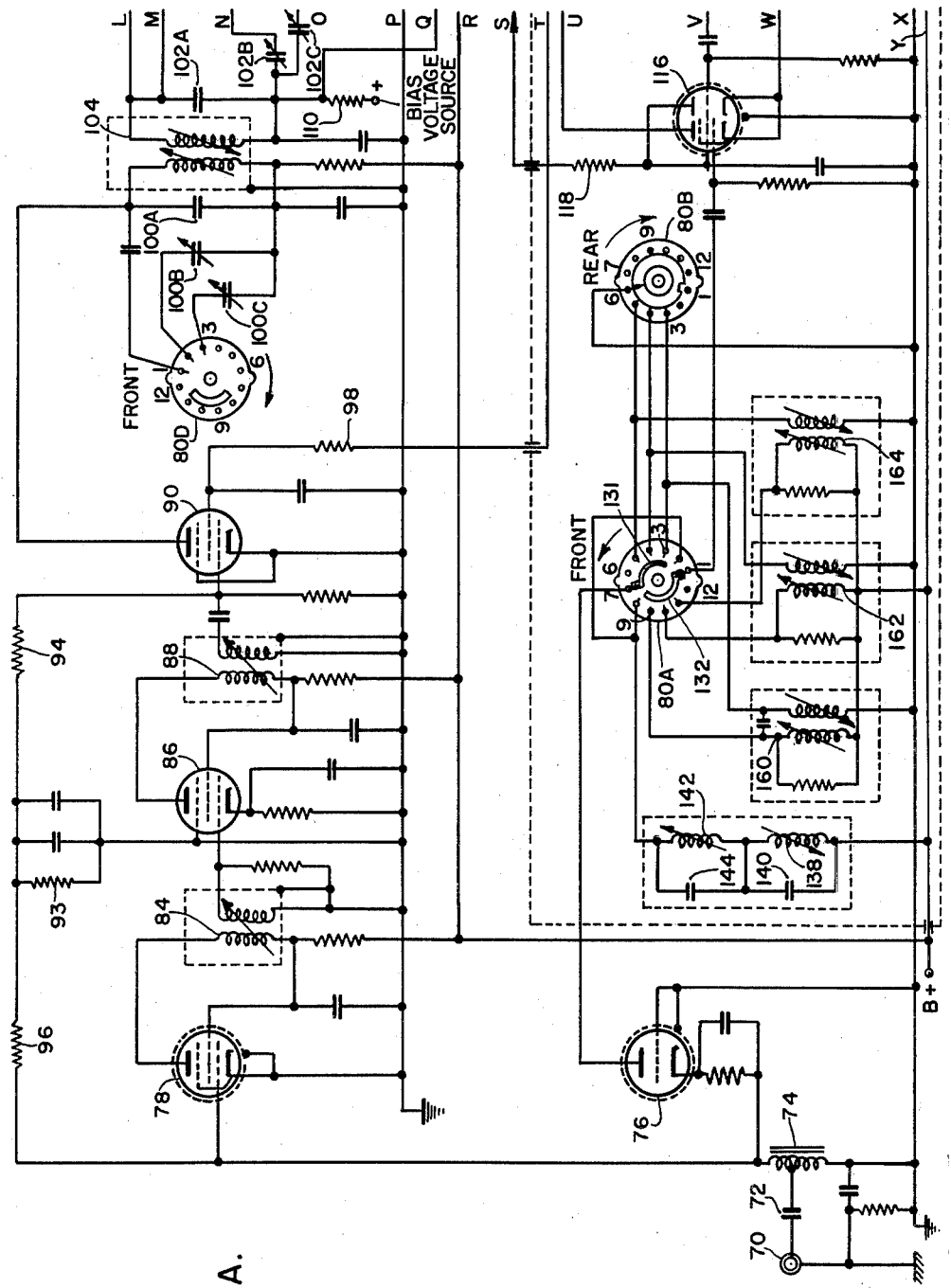

FIGURES 4A and 4B comprise a circuit diagram of a receiver attachment in accordance with this invention; and FIGURE 5 is a relative response curve of a portion of the circuitry used for amplifying control carriers and pilot carrier, shown to assist in an understanding of this invention.

This embodiment of the invention has been constructed for a closed-circuit television system wherein it was desired to have three separate entertainment channels. These channels will be respectively designated as Channel A, Channel B, and Channel C. The description of the invention which will be made herein will be of such three-channel system. It should be appreciated that this is not to be construed as a limitation upon the invention, but merely exemplary, since as will become apparent, as many channels as are desired in a system may be used using standards and frequencies other than those given without departing from the scope and spirit of this invention.

The standards for each channel which is transmitted are the normal standards employed for a television transmission, with the exception that an inverted channel is used. Thus, for each channel, the over-all channel width is 6 mc./s. with the video carrier located at 4.75 mc./s. and the program audio carrier located at 0.25 mc./s. An intercarrier separation of 4.50 mc./s. is provided, and the peak power of the video carrier to the power of the audio carrier is in the ratio of 2:1. The audio-signal bandwidth is 200 kc./s., and a chrominance subcarrier may be located at 1.17 mc./s. There is a tolerance on video-carrier frequency of ±1000 c.p.s. and a tolerance on audio-carrier frequency of ±1000 c.p.s. The attenuation at the channel edges is —20 db. The location of the carriers and subcarriers just given are stated with respect to the lower-frequency edge of the channel. In a color transmission, the color subcarrier and color-burst signals may be added in the normal manner.

Further illustrating a specific embodiment of the invention which has been built, but not by any means to be construed as a limitation upon the invention, there follows a list of the frequencies of signals which are transmitted over three channels and the public-information channel.

Channel A: The control carrier is 8.475 mc./s. It is amplitude-modulated, having 100 percent negative modulation. Channel A bandwidth is 6.000 mc./s., covering a band from 10.000 to 16.000 mc./s. The audio carrier is located at 10.250 mc./s. It is frequency-modulated, having a ±25 kc./s. deviation. The video carrier is located at 14.750 mc./s. It is amplitude modulated, has a maximum 88 percent negative modulation, and has a vestigial upper sideband.

Channel B: The control carrier is 8.525 mc./s. It is amplitude-modulated, having 100 percent negative modulation. Channel B bandwidth is 6.000 mc./s., covering a band from 24.100 to 30.100 mc./s. The audio carrier is located at 24.350 mc./s. It is frequency-modulated, having ±25 kc./s. deviation. The video carrier is located at 28.850 mc./s. It is amplitude-modulated, has a maximum 88 percent negative modulation, and has a vestigial upper sideband.

Channel C: The control carrier is 8.575 mc./s. It is amplitude-modulated, having 100 percent negative modulation. Channel C bandwidth is 6.000 mc./s., covering a band from 32.600 to 38.600 mc./s. The audio carrier is located at 32.850 mc./s. It is frequency-modulated, having ±25 kc./s. deviation. The video carrier is located at 37.350 mc./s. It is amplitude-modulated, has a maximum 88 percent negative modulation, and has a vestigial upper sideband.

Public-information channel: The public-information carrier is located at 4.315 mc./s. It is frequency-modulated, with ±25 kc./s. deviation. The pilot carrier 8.815 mc./s. has no modulation. The same pilot carrier is used in Channels A, B, and C.

The above list of frequencies lends itself to conversion to a standard television channel 5, in an area where channel 5 is not otherwise engaged.

Reference is now made to FIGURE 1, which is a block diagram of a transmitter in accordance with this invention. There is provided for each channel a video source, respectively 10, 12, 14, and a sound source, respectively 16, 18, 20. These respective sources represent a well-known apparatus at a transmitting station for producing video signals and sound signals. The respective video and sound sources for each channel are modulated on carriers and added for transmission in a Channel A video and sound transmitter 22, a Channel B video and sound transmitter 23, and a Channel C video and sound transmitter 24. This apparatus is also well-known equipment, which is employed at a television transmitter. The output of the respective channel video and sound transmitters 22, 23, and 24 are respectively applied to a vestigial sideband filter, respectively 25, 26, and 27. These structures are also known with the distinction, however, that, as previously indicated, the vestigial sideband of the video and sound signals being transmitted exists on the upper side of the channel, rather than on the lower side. The respective vestigial sideband filter outputs are applied to a carrier-level equalizer 30, whose function it is to equalize the carrier levels.

In addition to the above equipment, there is provided at the transmitter for each channel a Channel A price-and-program pulse generator 32, a Channel B price-and-program pulse generator 33, and a Channel C price-and-program pulse generator 34. The equipment represented by the rectangles 32, 33, and 34 comprises the well-known apparatus for establishing signals, such as pulses, which can actuate equipment at a receiver attachment for setting up the price for viewing a program and for identifying that program. By way of illustration, such equipment can be a rotating disc, having holes in the periphery and a photocell on one side and an electric light on the other side. The photocell output will be a number of pulses in accordance with the number of holes provided, the pulses having a spacing and pulse width determined by the hole size and spaces therebetween. A different disc may be employed for each program, if desired. The output from the respective price-and-program pulse generators 32, 33, 34 are respectively applied to a Channel A pricing-control transmitter 35, a Channel B pricing-control transmitter 36, and a Channel C pricing-control transmitter 37. These transmitters comprise known equipment for modulating the price-and-program pulses or signals on a carrier, the frequency of which has been previously indicated. The outputs of the respective pricing-control transmitters are also applied to the carrier-level equalizer to have the amplitude established properly, along with the other carriers which are thereafter to be applied to a distribution cable.

For the public-information channel, there is provided an audio source 40, which can comprise any known audio-signal source, the purpose of which is to inform the public as to the program to be transmitted on each channel. This barker audio source 40 is connected to the barker transmitter 42. This is a frequency-modulation transmitter, and its output, consisting of barker sound frequency-modulated on a carrier, is applied to the carrier-level equalizer 30. There is also provided a pilot carrier generator 44, the output of which is also connected to the carrier-level equalizer 30. The Channel A, Channel B, and Channel C video carriers are at 0 db, and the audio carriers are at —3 db with respect to the video carrier. The control carriers are at —6 db, the pilot carrier is at —6 db, and the public-information carrier is at —12 db. The outputs from the carrier-level equilizer are all applied to a carrier multiplexer 32 which serves the function of combining all these equalized carriers so that they may be connected to a distribution cable.

FIGURE 2 is a block diagram of the apparatus present in the subscriber's home. This will include the subscriber's television receiver 50. A switch 52 is connected to the television-receiver antenna terminals, whereby the subscriber can either switch to his antenna 54 for programs other than subscription-television programs or to the attachment for subscription-television programs. This attachment includes circuitry and components which are represented in FIGURE 2 by rectangles bearing functional designations. The signals from the transmitters shown in FIGURE 1 are applied to two circuits, respectively designated by control-signal processing circuits 56 and by program-signal processing circuits 58. The control-signal processing circuits portion of the attachment, as well as the program-signal processing circuits, may be selectively operated to receive the signals allocated for Channel A, or Channel B, or Channel C, as desired. In addition, they may be selectively operated to receive the barker audio signals being transmitted over the program-information channel. The attachment at all times receives the pilot carrier signal. As previously described, when the attachment is tuned to the public-information channel, then the barker signals modulated on a carrier together with pilot signals are fed to the television receiver, which processes these signals in the manner of audio signals which usually accompany any video broadcast.

When the attachment is tuned to any one of the Channels A, B, or C, then the control-signal processing circuit selects those control signals which are associated with the particular channel for which the attachment has been tuned and applies these control signals to the coinbox apparatus 60. The coinbox apparatus may be of a type described and claimed in Patent No. 2,966,980, to John C. Nyberg, for Coinbox for Subscription Television. The coinbox apparatus 60 includes a rotatable cam 62, which is rotated upon payment of a demanded price to close a switch, designated as PW3. The control-signal processing circuit 56 can actuate the coinbox apparatus 60 to indicate to a subscriber by a mechanism, not shown here, the amount of the price demanded for viewing the program. Upon payment of said price, either by a deposit of coins or by actuation of any other mechanism for indicating the assumption of liability for payment, the coinbox apparatus 60 rotates the cam 62 to close the switch PW3. The switch PW3 applies B+ to the program-signal processing circuits to enable them to become operative to convert the program video and audio to frequencies which the television receiver can handle in a normal manner. The coinbox apparatus 60 also actuates a recorder 63 so that it can record some of the control signals, both for indicating that a payment was made and for identifying the program for which such payment was made.

FIGURE 3 is an isometric view illustrating the external appearance of a television-receiver attachment in accordance with this invention. This comprises a closed container 63 in which the required circuitry is contained. A first knob 65 affords switching to either the television antenna for receiving the regular television broadcast or to the subscription-television distribution system. A second knob 66 enables a subscriber to turn the power and to switch to any of five positions, respectively designated as off, public information, Channel A, Channel B, and Channel C.

The coinbox mechanism is contained within the portion of the container 63 having a sloping panel. In this sloping panel there is provided a price window 67, a credit window 68, a coin slot 69, and a payup button 71. The price demanded for a program may be seen through the price window 67. Coins, for paying that price, are inserted in the coin slot 69. The amount of coins deposited may be seen in the credit window 68. When this equals or exceeds the amount of the price shown in the price window, then the payup button 71 may be depressed. This subtracts the amount shown in the price window from the amount shown in the credit window, leaving the price window registering paid and the credit window registering either zero or whatever value of coins has been deposited which exceeds the value of the demanded price. This is applied as a credit against the price demanded for the next program.

The situation described remains as long as control signals are transmitted. If these are interrupted, the price window will show a "no-price" demand, but the credit window will still show the amount of credit previously registered.

Reference is now made to FIGURES 4A and 4B, which in combination illustrate a circuit diagram of the receiver attachment in accordance with this invention. An input terminal 70 is provided for connecting to the coaxial cable, which distributes the program from the transmitter. This is connected through a capacitor 72 which, in conjunction with an inductance 74, provides a wide-band circuit for passing all of the signals for the public-information channel and for Channels A, B, and C (approximately 4 to 40 mc.) to the cathode of a grounded-grid amplifier tube 76 and to the control grid of a pentode tube 78. For the purpose of selecting one of Channels A, B, and C, or the program-information channel, there is provided a five-section or five-deck selector switch, respectively 80A, 80B, 80C, 80D, and 80E. Three of these sections 80A, 80B, and 80C are assigned to the converter portion of the attachment, and two of the sections 80D and 80E are assigned to the control-signal portion of the attachment. These five sections are simultaneously rotated by means of knob 66 (FIGURE 3). Another selector switch having two sections 82A and 82B is employed for switching the television receiver, either to the external antenna or to the attachment. These two sections are simultaneously rotated by means of knob 65 (FIGURE 3). The selector switch 80A through 80E is shown in the drawings as being in the "off" position where none of the channels is selected and where power is turned off, and the switch 82A and 82B is shown in the position wherein the switch selects the external antenna.

The plate circuit of tube 78 is tuned to the frequency of the pilot carrier, which has been indicated at 8.815 mc., by means including a coupling transformer 84, which couples the plate of tube 78 to the control grid of tube 86. Tube 78 amplifies the control signals, which are modulated on their carriers, as well as the pilot carrier. However, the tuning of the circuit elements are such that, as shown by the relative response curve of FIGURE 5, the greatest amount of amplification is given to the pilot-carrier signal. The amplified signals are applied to a second stage of amplification, including the tube 86, which has its plate also tuned by the circuit 88 to give peak amplification to the pilot carrier. The output of amplifier 86 and the three control signals modulated on their carriers are applied to a mixer and automatic-gain-control detector-stage tube 90.

At the input terminals of the control-channel amplifier 78, the levels of the control carriers and the pilot carrier are the same (nominal input 500 microvolts at the 75-ohm coaxial-input terminal, with Channels A, B, and C levels referred to the pilot carrier within ±1 db). The pilot carrier is fully amplified while the control carriers are purposely amplified, so that they reach the mixer stage 90 at a reduced level (about 8 to 12 db lower than the pilot carrier). FIGURE 5 shows the relative response curve 92, which indicates the relative levels of the four carriers which are applied to the mixer tube 90. FIGURE 5 is a plot of the relative response in decibels versus frequency in megacycles.

The output of amplifier 86 is coupled through transformer 88 to the control grid of tube 90. The tube 90 now acts as a true mixer, where the pilot-carrier voltage at the grid corresponds to an oscillator voltage, and the control carriers correspond to three different incoming signals. To insure proper mixing and reasonably low modulation between the control-channel signals, the sum of the peak levels of the control carriers at the grid is purposely kept below the level of the pilot carrier at all times. At the normal input-signal voltages, as indicated above, and within the limits of normal level variations of the distribution system, the level of the pilot carrier at the grid of the mixer stage 90 is on the order of 3 to 9 volts, which yields proper mixing operation with high conversion transconductance. The negative direct-current voltage developed at the grid of tube 90 is used for automatic gain control, or AGC, purposes, part of this voltage being fed back through a shunt resistor 93 and through resistors 94 and 96, which are connected between the grid of tube 90 and the control grid of tube 78. Both because of this "AGC feedback" circuit and by virtue of the fact that when pilot-carrier input to the tube 90 is raised beyond a certain level, the conversion transconductance is reduced and the output from the mixer is held fairly independent of the input levels. The mixer tube 90 is disabled by removing screen voltage therefrom when the channel-selector switch sections 80A through 80E are turned to the "public-information" position. The connection of the screen grid of tube 90 to selector-switch section 80C may be traced through the resistor 98 to the terminal 12 of switch section 80C.

As a result of the mixing action by tube 90, three intermediate frequencies are available at its plate circuit. One of these three is selected by means including the switch sections 80D and 80E. The switch sections 80D and 80E select proper combinations of the capacitors 100A, 100B, 100C, and 102A 102B, 102C.

Capacitor 100A is permanently connected across the primary of IF transformer 104, and capacitor 102A is permanently connected across its secondary. These capacitors tune the transformer to an intermediate frequency of 340 kc. when the channel-selector switch sections 80D and 80E are in position "Channel A." Upon switching switch sections 80D and 80E to the Channel B position, capacitors 100B and 102B are connected in parallel with capacitors 100A and 102A, tuning the circuit to 290 kc. When switch sections 80D and 80E are in the Channel C position, capacitors 100C and 102C are connected in parallel with these others, to tune the IF transformer to 240 kc. The plate of tube 90 is coupled to the primary of an IF transformer 104. The three IF frequencies, one of which may selected, are 240 kc., 290 kc., or 340 kc., respectively. The switching IF transformer 104, itself, is tuned for operation at 340 kc. when the channel-selector switch is in position to select Channel A. It is changed to 290 kc. on Channel B; for Channel C, the frequency is 240 kc. Considerable gain is obtained in this stage through the high-conversion transconductance of the mixer tube 90, and therefore IF voltages having a sufficient amplitude for operation of control logic circuitry are available.

It should be noted here that the circuitry described performs a number of different functions in addition to amplifying the RF signals, some of which functions are unique. For example, by means of the special over-all response curve, as shown in FIGURE 5, a necessary attenuation of the control carriers is provided whereby the mixer stage may properly process them. Thus, the necessity for a special oscillator section for obtaining the three different IF frequencies for the control carriers is obviated. By means of the AGC circuit, a fairly constant IF output of the selected control channel is obtained for different input levels. The rectified negative voltage at the mixer grid is used for the AGC purposes.

One of the selected IF signals at the secondary of the transformer 104 is applied to the grid-cathode section of a tube 106. This grid-cathode section is used as a diode and serves to detect the control signals which are employed for both pricing purposes and to actuate a monitor relay 114. Two control-voltage outputs are obtained from the detector tube 106. One control output is a positive voltage and is applied to the control grid of a monitor tube 108. The other control output is a negative output, which is derived from the side of the secondary winding of the IF transformer 104, which is connected to a resistor 110. A positive bias voltage is applied to the resistor 110. A connection is made from the junction of the resistor 110 and the secondary winding of the IF transformer 104 to apparatus represented by a rectangle 112, which represents circuitry designated as control-signal utilization apparatus. The designation "control-signal utilization apparatus" is intended to include the circuits and apparatus which are operated in response to the control signals, such as the monitor tube 108 and the monitor relay 114A, connected in series with its anode, a pricing tube 109 to which the negative-control signals are applied, and the coinbox apparatus 60 and recorder 63, which are driven from the pricing tube.

The purpose of applying a bias voltage to the detector circuit through resistor 110 is to insure that the detector circuit is inoperative for low-level input RF signals. This insures that the pulse signals, which are applied to the control-signal utilization apparatus, are "clean" in that they must exceed the level established by the bias voltage source, and, further, they do not cause jitter or erratic operation due to gradual sloping portions of the leading edges of the pulses. The tube 108 has a relay coil 114 connected in series therewith. Thus, in the presence of control signals which have been detected by the tube 106, the tube 108 can apply current to the relay coil 114 to enable it to close contacts 114A. Closure of contacts 114A enables the control-signal utilization apparatus to receive operating potential.

The pulses derived from the lower half of the IF transformer 104, which are designated as pricing pulses, also include the pulses which can be employed for identifying the program for which payment has been made. These pulses are applied to the control grid of a tube 109. The control grid-cathode section of this tube acts as a diode to clamp the end of the resistor 110 connected to the secondary of the transformer 104 to ground for positive potentials. The tube will amplify the negative-pricing pulses and apply them to the coinbox apparatus to cause it to indicate the price demanded to view a program. Upon payment of the price the cam 62 shown in FIGURE 2 is rotated to a position to close switch PW3, shown again in FIGURE 4B. Switch PW3, on closing, applies B+ voltage to terminal 11 of switch section 80C and to terminal 3 of switch section 82A. Also, upon payment of the price, a double-pole double-throw switch 111A and 111B is operated from the position shown, wherein it connects voltage to the plate and through resistor 113 to the screen grid of the tube 109 to a position connecting the screen grid of the tube 109 to recorder apparatus 63 and removing B+ from the tube plate. Thus, the cathode, control grid, and screen grid of tube 109 act as a triode to amplify the received pulses to apply them to the recorder.

It was previously pointed out that the switch sections 80A through 80E are shown in the off position and switch sections 82A and 82B are in the position for connecting the outside antenna to the receiver. Assume it is desired to secure a subscription-television program, and, further, it is desired to listen to the public-information channel. Switch sections 82A and 82B are rotated so that the antenna terminals 118A and 118B of the television receiver are switched from their connection to the outside of the antenna terminals 120A and 120B to the output of the attachment. It will be seen that this occurs when the contact 121, shown bridging terminals 6 and 8 on switch section 82B, and contact 122, shown connecting to terminals also on this switch section, are all rotated so that contact 121 connects terminals 8 and 9 of the switch section, thus effectively shorting the outside antenna terminals to a 330-ohm resistor, and contact 122 connects terminals 4 and 6. The switch section 82A is rotated, together with the switch section 82B, since it is ganged therewith. Thus, the rotating contact 124 moves from the position shown to a position wherein it connects together the terminals 1 and 3. This applies B+ to the triode and pentode sections of tube 116. Movable contact 125 also is rotated from the position shown to one wherein it connects terminal 12 with terminal 6 on the switch section 82A. Thereby, the output of the receiver attachment is effectively connected to the output transformer 130, which serves as the output of the receiver attachment and the input to the receiver antenna terminals.

The first position to which the switch sections 80A through 80E can be rotated, after the off position, is the public-information, or PI, position. This places the rotatable contact 131 in switch section 80A in a position so that terminals 7 and 8 on that switch section are connected together, and the contact 132 connects together terminals 1 and 2. Switch section 80C, which is rotated simultaneously with switch section 80A, connects together, by means of its rotating contact 133, terminals 10 and 11, and by means of its rotating contact 134 connects terminals 5 and 6.

With the switches in the PI position, two tuned circuits, comprising variable inductance 138 and shunt capacitor 140, and variable inductance 142 and shunt capacitor 144, are connected in series from B+ to the plate of tube 76. The inductance 142 and shunt capacitor 144 comprises a high-Q circuit peaked at 8.815 mc., the pilot frequency, and the inductance 138, in shunt with capacitance 140, comprises a tuned circuit peaked at 4.315 mc., the public-information carrier frequency. The output of the tube 76, which comprises amplified pilot carrier and public-information signals modulated on its carrier, are connected through terminals 2 and 1 on switch section 80A to the control grid of a pentode-mixer section of tube 116. It should be noted that B+ for the pentode section of the tube 116 is applied over a connection from switch PW3 through a resistor 145 and through the primary of a transformer 156A. The triode section of tube 116 acts as an oscillator, which is tuned by means of an inductance 146 and a variable capacitance 148, connected in parallel therewith by the movable contact 134 of the switch section 80C. Inductance 146 is connected to the control grid of the triode section of tube 116. The inductance 146 and the respective capacitors 148, 150, 152, and 154 are used for tuning the oscillator to provide the various required heterodyne frequencies to convert the one-of-the-selected incoming public-information channel frequencies, as well as Channels A, B, or C frequencies, to a channel frequency to which the television receiver can tune.

The output of the pentode section of the tube 116 is connected to a network 156, which contains two tuned transformers 156A and 156B for providing the required circuitry for passing a six-megacycle bandwidth at the channel frequencies to which the receiver of the subscriber is tuned for reproducing the subscription-television program. The network 156 has its output connected to the transformer 130, which is coupled to the televison-receiver terminals 118A, 118B.

In the embodiment of the invention which has been built, and for the frequencies previously described, the converted pilot carrier was 77.25 mc./s. unmodulated, and the public-information carrier was 81.75 mc./s., which was frequency modulated. (This comprises channel 5 signals.) The pilot carrier serves a very necessary function—that of enabling modern television receivers of the "intercarrier" type to be able to reproduce the barker sound normally. In these receivers the picture carrier is used as a second local oscillator, against which to beat the sound intermediate-frequency carrier. This produces a second intermediate frequency of 4.5 mc. (the intercarrier spacing), which is fully frequency modulated. The barker audio would not be reproduced if the program-information channel, without a pilot carrier, were applied to the receiver, since the "second-local-oscillator" frequency would then not be present. Thus, the pilot carrier serves the function of the picture carrier to enable the receiver to reproduce the barker audio. Older receivers of the "split IF" type can also operate from these outputs of the attachment, since in those receivers the program-information carrier will be separated from the pilot carrier and the input to the IF channel and will be processed in the normal manner. No retuning of a television receiver is necessary when the receiver attachment is switched for operation from a telemeter channel to a program-information channel.

The subscriber may select any one of Channels A, B, or C without first tuning to the program-information channel. The tuned circuit 160 is connected over terminal 9 of switch section 80A to the plate of tube 76 to preselect Channel A. The tuned circuit 162 is connected over terminal 10 of switch section 80A to the plate of tube 76 to preselect Channel B. The tuned circuit 164 is connected over terminal 11 of switch section 80A to the plate of tube 76 to preselect Channel C. Switch section 80A over contacts 3, 4, and 5 serves to couple these tuned circuits to the control grid of the pentode portion of the oscilator-converter tube 116. Switch section 80B over contacts 3, 4, and 5 serves to short out those secondary windings which are not used. Switch sections 80D and 80E operate in a manner previously described for selecting the proper tuned circuit, whereby the control signals associated with the one of the three channels selected are separated from the other control signals and are thereafter applied to the control-signal utilization apparatus.

There has accordingly been described herein a novel and useful attachment for subscription-television systems, wherein any commercial receiver may be incorporated into the subscription-television system by the simple expedient of connecting the attachment between the antenna terminals of the receiver and the regular antenna. In accordance with this invention, the pilot carrier provides a dual function. One of these is that of enabling an intercarrier sound receiver system to reproduce the barker sound on the program-information channel. The second function is to serve as a local oscillator frequency in the control channel, thus eliminating the need for an oscillator. By employing the receiver of a subscriber for reproducing the sound received over the public-information channel, a further saving of components is made over previous attachments of this type which included all the components necessary for demodulating audio signals from the barker carrier and then reproducing the demodulated audio.

I claim:

1. In a subscription-television system of the type wherein there are transmitted television program signals modulated on a carrier which a commercial receiver cannot process, barker audio signals modulated on a carrier and a pilot signal comprising an unmodulated carrier, an attachment for integrating a commercial television receiver into said subscription-television system comprising means for receiving all said transmitted signals, means for selecting one of said barker audio signals modulated on a carrier together with said pilot signal, or said television-program signals modulated on a carrier, and means for translating when selected said barker audio signals modulated on a carrier and said pilot signal to carrier frequencies which can be processed by a commercial receiver for reproducing said barker audio signals, and when selected the frequency of the carrier of said television program signals to a carrier frequency whereby said program signals can be reproduced by a commercial television receiver.

2. In a subscription-television system of the type wherein there are transmitted television-program signals modulated on a carrier which a commercial receiver cannot process, barker audio signals modulated on a carrier and a pilot signal comprising an unmodulated carrier, an attachment for integrating a commercial television receiver into said subscription television system comprising means for receiving all said transmitted signals, a first tuned circuit for passing only said barker audio signals and pilot signal, a second tuned circuit for passing only said television-program signals, a frequency converter, a third tuned circuit for enabling said converter to convert the frequency of said barker and pilot carrier signals to carrier frequencies with which a commercial receiver can reproduce said barker audio signals, and a fourth tuned circuit for enabling said converter to convert the frequency of said television-program carrier to a frequency which a commercial receiver can process, and switch means for selectively connecting one of said first or second tuned circuits to said means for receiving while connecting one of said third or fourth tuned circuits to said converter.

3. In a subscription-television system of the type whereing there are transmitted barker audio signals modulated on a carrier and pilot signals comprising an unmodulated carrier, an improved attachment for integrating a commercial television receiver into said subscription-television system, said receiver attachment including means for receiving said signals, and means for combining said received pilot signals and said received barker audio signals modulated on a carrier for enabling reproduction of said barker audio by a commercial television receiver having an inter-carrier sound reception system.

4. In a subscription-television system of the type wherein there are transmitted a plurality of different sets of attachment control signals, each said set of control signals being modulated on a different carrier, and pilot signals comprising an unmodulated carrier signal, an attachment for integrating a commercial television receiver into said subscription-television system comprising means for receiving all said transmitted signals, means for combining said received pilot signals and said received plurality of sets of attachment control signals respectively modulated on different carriers to produce a different intermediate frequency for each set of attachment control signals, first switch means for selecting a different one of said intermediate freqeuncies from the output of said means for amplifying and mixing, means for detecting control signals connected to the output of said first switch means, and means for utilizing control signals connected to the output of said means for detecting control signals for controlling said attachment.

5. In a subscription-television system of the type wherein there are transmitted control signals modulated on a carrier, barker audio signals modulated on a carrier and pilot signals comprising an unmodulated carrier, an improved attachment for integrating a commercial television receiver into said subscription-television system, said receiver attachment including means for receiving said signals, means for combining said pilot signals and said control signals modulated on a carrier to produce an intermediate-frequency carrier with said control signals modulated thereon, means for detecting said control signals from said intermediate-frequency carrier, means for utilizing said detected control signals, and means for combining said received pilot signals and said received barker audio signals modulated on a carrier for enabling reproduction of said barker audio by a commercial television receiver having an intercarrier sound reception system.

6. In a subscription-television system as recited in claim 5 wherein said means for combining said pilot signals and said barker audio signals modulated on a carrier to produce an intermediate frequency comprises means for amplifying said pilot signals to have an amplitude which is large relative to said barker audio carrier, means for mixing the output of said means for amplifying, and tuned circuit means connected to the output of said means for mixing for selecting said intermediate-frequency carrier signals.

7. In a subscription-television system of the type wherein there are transmitted program signals modulated on a carrier which a commercial-television receiver cannot process, attachment control signals modulated on a carrier, barker audio signals modulated on a carrier and a pilot signal comprising an unmodulated carrier, an attachment for integrating a commercial television receiver into said subscription-television system comprising means for receiving all said transmitted signals, means for combining said received pilot signal carrier and said control signals modulated on a carrier to provide an intermediate frequency modulated by said control signals, means connected to said means for combining output for detecting said control signals from said intermediate frequency modulated by said control signals, means connected to said means for detecting for utilizing said detected control signals, an oscillator a source of operating potential for said oscillator, first means for tuning said oscillator to oscillate at a first carrier frequency which when heterodyned with a received program carrier converts said carrier to a frequency which a commercial receiver can process for reproducing said programs, second means for tuning said oscillator to oscillate at a second carrier frequency which when heterodyned with a received pilot carrier signal and a barker signal modulated on a carrier converts said carriers to a frequency which a commercial receiver having an intercarrier sound receiving system can process for reproducing said barker audio, switch means for selectively connecting one of said first and second means for tuning to said oscillator, and for connecting said source of operating potential to said oscillator when connecting said second means for tuning to said oscillator, a mixer circuit connected to receive the output of said oscillator circuit, output terminals on said attachment connected to receive output from said mixer circuit, and means responsive to operation of said means for utilizing control signals to connect said source of operating potential to said oscillator.

8. In a subscription-television system of the type wherein there are transmitted a plurality of different program signals each modulated on a different carrier which a commercial television receiver cannot process, a plurality of different sets of attachment control signals, each said set of control signals being modulated on a different carrier, each set of attachment control signals representing information relative to a different one of said plurality of program signals, barker audio signals modulated on a carrier, and pilot signals comprising an unmodulated carrier signal, an attachment for integrating a commercial television receiver into said subscription-television system comprising means for receiving all said transmitted signals, means for combining said received pilot signals and said received plurality of sets of attachment control signals respectively modulated on different carriers to produce a different intermediate frequency for each set of attachment control signals, first switch means for selecting a different one of said intermediate frequencies from the output of said means for amplifying and mixing, means for detecting control signals connected to the output of said first switch means, and means for utilizing control signals connected to the output of said means for detecting control signals for controlling said attachment, an oscillator, a source of operating potential for said oscillator, a plurality of different tuned circuits a first of which when connected to said oscillator causes it to oscillate at a frequency which when heterodyned with said pilot carrier and said barker audio carrier converts them to frequencies which a commercial television receiver having an intercarrier sound-receiving system can process for reproducing said barker audio, each one of said remaining tuned circuits when connected to said oscillator cause it to oscillate at a frequency which when heterodyned with a received program carrier converts said carrier to a frequency which a commercial receiver can process for reproducing said program, second switch means for selectively connecting a different one of said plurality of tuned circuits to said oscillator and including means for applying said source of operating potential to said oscillator when connecting said first of said tuned circuits to said oscillator, means coupling said first and second switch means for simultaneous operation for selection of an intermediate frequency on which are modulated a set of attachment control signals which represent information related to the program signals which are enabled to be processed and reproduced by operation of said second switch means, and means for applying said operating potential to said oscillator responsive to operation of said means for utilizing control signals.

9. In a subscription-television system as recited in claim 8 wherein said means for combining said received pilot signals and said received plurality of sets of attachment control signals modulated on different carriers to produce a plurality of intermediate frequencies comprises means for amplifying all of said signals to produce pilot signals which have a greater amplitude than that of said control-signal carriers, and means for mixing the output of said means for amplifying.

10. A subscription-television system comprising a transmitter and an attachment for enabling a commercial television receiver to be integrated into a subscription-television system, said transmitter including means for transmitting a barker audio signal modulated on a carrier, means for transmitting attachment control signals modulated on a carrier, and means for transmitting pilot signals comprising an unmodulated carrier; said attachment including means for receiving all said transmitted signals, means for combining said attachment control-signal carrier and said pilot signals to provide an intermediate frequency, means for detecting said control signals from said intermediate frequency, means for utilizing said detected control signals, and means for translating the frequencies of said received barker audio signal carrier and said pilot signals to carrier frequencies which a commercial television receiver having an intercarrier sound-reception system can process for reproducing said barker audio.

11. A subscription-television system comprising a transmitter and an attachment for enabling a commercial television receiver to be integrated into a subscription-television system, said transmitter including means for transmitting program signals modulated on a carrier which a commercial television receiver cannot process, means for transmitting attachment control signals modulated on a carrier, said attachment control signals representing information relevant to said program signals, means for transmitting barker audio signals modulated on a carrier, and means for transmitting a pilot signal comprising an unmodulated carrier; said attachment comprising means for receiving all said transmitted signals, means for combining said received pilot signal carrier and said control signals modulated on a carrier to provide an intermediate frequency modulated by said control signals, means connected to said means for combining output for detecting said control signals therein, means connecting to said means for detecting for utilizing said detected control signals, an oscillator, a source of operating potential for said oscillator, first means for tuning said oscillator to oscillate at a first carrier frequency which when heterodyned with a received program carrier converts said carrier to a frequency which a commercial receiver can process for reproducing said program, second means for tuning said oscillator to oscillate at a second carrier frequency which when heterodyned with a received pilot carrier signal and a barker signal modulated on a carrier converts said carriers to a frequency which a commercial receiver having an intercarrier sound receiving system can process, for reproducing said barker audio, switch means for selectively connecting either one of said first and second means for tuning to said oscillator, and for connecting said source of operating potential to said oscillator when connecting said second means for tuning to said oscillator, a mixer circuit connected to receive the output of said oscillator circuit, output terminals on said attachment connected to receive output from said mixer circuit, and means responsive to operation of said means for utilizing control signals to connect said source of operating potential to said oscillator.

12. A subscription-television system comprising a transmitter, and an attachment for enabling a commercial television receiver to be integrated into a subscription-television system, said transmitter including means for transmitting a plurality of different program signals each of which is modulated on a different carrier and none of which a commercial television receiver cannot process, means for transmitting a plurality of sets of attachment control signals each set modulated on a different carrier, each set of attachment control signals representing information relevant to a different one of said plurality of program signals, means for transmitting barker audio modulated on a carrier and means for transmitting a pilot signal comprising an unmodulated carrier signal; said attachment comprising means for receiving all said transmitted signals, means for combining said received pilot signals and said received plurality of sets of attachment control signals modulated on different carriers to produce a plurality of intermediate frequencies, first switch means for selecting a different one of said intermediate frequencies from the output of said means for amplifying and mixing, means for detecting control signals connected to the output of said first switch means, means for utilizing control signals connected to the output of said means for detecting control signals, an oscillator, a source of operating potential for said oscillator, a plurality of different tuned circuits a first of which when connected to said oscillator cause it to oscillate at a frequency which when heterodyned with said pilot carrier and barker audio carrier convert them to frequencies which a commercial television receiver having an intercarrier sound receiving system can process for reproducing said barker audio, each one of said remaining tuned circuits when connected to said oscillator cause it to oscillate at a frequency which when heterodyned with a received program carrier converts said carrier to a frequency which a commercial receiver can process for reproducing said program, second switch for selectively connecting a different one of said plurality of tuned circuits to said oscillator and including means for applying said source of operating potential to said oscillator when connecting said first of said tuned circuits to said oscillator, means coupling said first and second switch means for simultaneous operation for selection of an intermediate frequency on which are modulated a set of attachment control signals which represent information related to the program signals which are enabled to be processed and reproduced by operation of said second switch means, and means for applying said operating potential to said oscillator responsive to operation of said means for utilizing control signals.

References Cited in the file of this patent
UNITED STATES PATENTS

| | | |
|---|---|---|
| 2,854,506 | Pickles | Sept. 30, 1958 |
| 2,918,522 | Ridenour | Dec. 22, 1959 |